(12) United States Patent
Brown

(10) Patent No.: US 11,395,949 B1
(45) Date of Patent: Jul. 26, 2022

(54) SUSPENSION STRAP ASSEMBLY FOR A PUNCHING BAG

(71) Applicant: James Brown, Waldorf, MD (US)

(72) Inventor: James Brown, Waldorf, MD (US)

( * ) Notice: Subject to any disclaimer, the term of this patent is extended or adjusted under 35 U.S.C. 154(b) by 348 days.

(21) Appl. No.: 16/774,130

(22) Filed: Jan. 28, 2020

(51) Int. Cl.
  *A63B 69/20* (2006.01)
  *F16M 13/02* (2006.01)
  *F16F 1/36* (2006.01)

(52) U.S. Cl.
  CPC ......... *A63B 69/201* (2013.01); *F16M 13/027* (2013.01); *F16F 1/36* (2013.01)

(58) Field of Classification Search
  CPC .................................................. A63B 69/201
  USPC ......................................................... 482/87
  See application file for complete search history.

(56) References Cited

U.S. PATENT DOCUMENTS

| | | | | |
|---|---|---|---|---|
| 2,156,831 A * | 5/1939 | Andre | ............... | A63B 69/201 383/22 |
| 3,281,148 A * | 10/1966 | Cummins | ............ | A63B 69/345 473/442 |
| 4,653,746 A * | 3/1987 | Brunier | ............... | A63B 69/201 473/442 |
| 4,721,302 A * | 1/1988 | Murphy | ............. | A63B 69/0053 482/901 |
| 4,911,428 A | 3/1990 | Wiece | | |
| 5,224,912 A * | 7/1993 | Moody | ............... | A63B 69/201 482/86 |
| 5,725,458 A * | 3/1998 | Newman | ............... | A63B 69/201 482/90 |
| 6,090,018 A * | 7/2000 | Laudenslager | ...... | A63B 69/201 482/90 |
| 6,461,281 B2 | 10/2002 | Bouvier | | |
| 6,758,794 B2 | 7/2004 | Lee | | |
| 8,029,421 B2 | 10/2011 | Commeau | | |
| 8,342,475 B2 | 1/2013 | Tsakiris | | |
| 9,211,465 B1 | 12/2015 | Lambrinos | | |
| 9,925,448 B2 | 3/2018 | Hockridge | | |
| 10,912,978 B2 * | 2/2021 | Bortolotto | ............ | A63B 69/201 |
| 2002/0010057 A1 * | 1/2002 | Bouvier | ............... | A63B 69/201 482/86 |
| 2002/0115538 A1 | 8/2002 | Wen | | |
| 2003/0073548 A1 * | 4/2003 | Haselrig | ............... | A63B 69/201 482/83 |
| 2003/0125168 A1 * | 7/2003 | Hackaday | ............ | A63B 69/206 482/89 |

(Continued)

FOREIGN PATENT DOCUMENTS

DE 202016002891 U1 * 9/2016
WO 2015002721 1/2015

*Primary Examiner* — Joshua T Kennedy
(74) *Attorney, Agent, or Firm* — Kyle A. Fletcher, Esq.

(57) ABSTRACT

The suspension strap assembly for a punching bag is an apparatus that is configured for use in physical training. The suspension strap assembly for a punching bag suspends a heavy bag in a manner appropriate for use in the physical training for boxing activities. The suspension strap assembly for a punching bag comprises a superior mount, a suspension apparatus, and a heavy bag. The suspension apparatus attaches the heavy bag to the superior mount. The heavy bag provides a target used for physical training. The superior mount suspends the suspension apparatus and the heavy bag from a load bearing structure such that the load of the suspension apparatus and the heavy bag are incorporated into the load path of a building or structure.

18 Claims, 3 Drawing Sheets

(56) References Cited

U.S. PATENT DOCUMENTS

| | | | |
|---|---|---|---|
| 2010/0032544 A1* | 2/2010 | Tsakiris | F16F 1/371 |
| | | | 248/610 |
| 2010/0093503 A1* | 4/2010 | Commeau | A63B 69/201 |
| | | | 482/148 |
| 2010/0179031 A1* | 7/2010 | Luigi | A63B 69/34 |
| | | | 482/148 |
| 2015/0011366 A1* | 1/2015 | Hockridge | A63B 69/205 |
| | | | 29/428 |
| 2016/0023078 A1* | 1/2016 | Haselrig | A63B 69/004 |
| | | | 482/90 |
| 2017/0021258 A1* | 1/2017 | Hoggatt | A63B 69/201 |
| 2017/0333774 A1* | 11/2017 | Bartron | A63B 71/023 |
| 2019/0217176 A1 | 7/2019 | Slechta | |
| 2020/0016473 A1* | 1/2020 | Leznik | A63B 1/00 |
| 2020/0246673 A1* | 8/2020 | Durbin | A63B 69/201 |
| 2021/0402276 A1* | 12/2021 | Peyton | A63B 69/201 |

\* cited by examiner

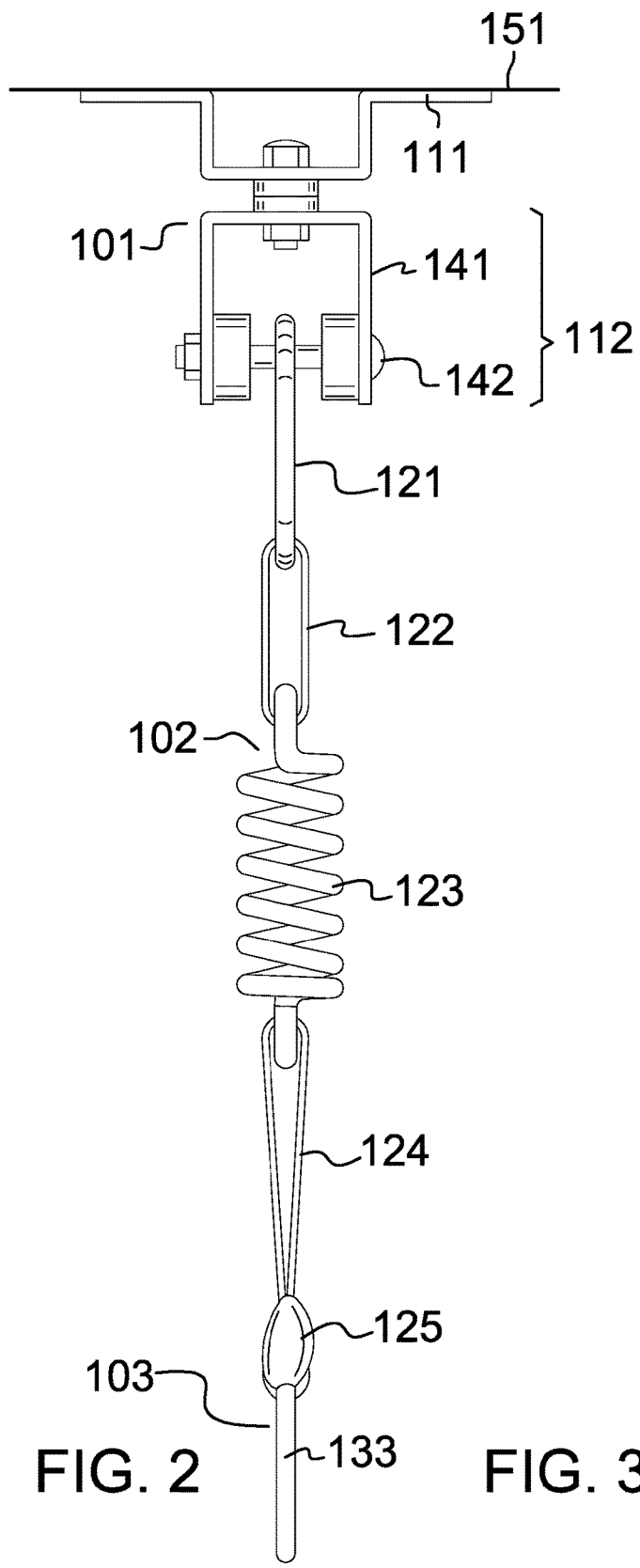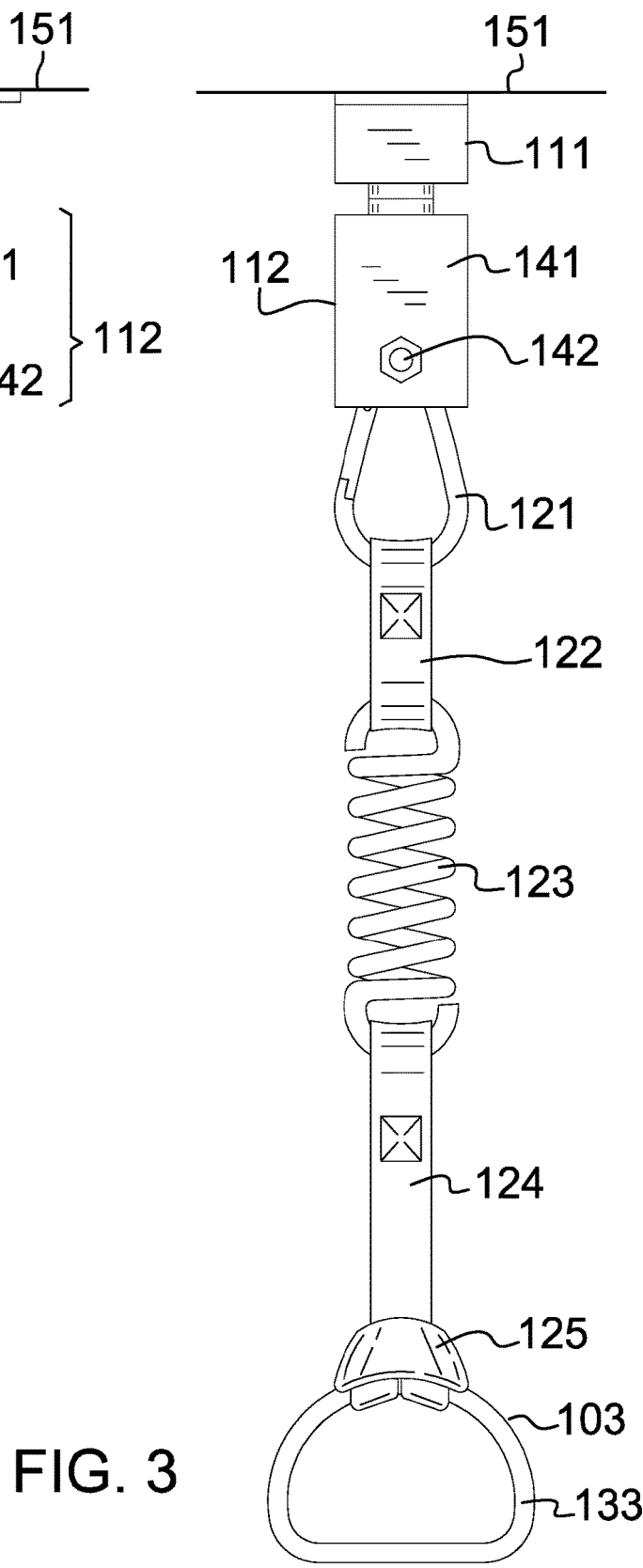

SUSPENSION STRAP ASSEMBLY FOR A PUNCHING BAG

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

FIELD OF THE INVENTION

The present invention relates to the field of sports including training apparatus including boxing training apparatus, more specifically, an apparatus configured for use with a heavy bag. (A63B69/201)

SUMMARY OF INVENTION

The suspension strap assembly for a punching bag is an apparatus that is configured for use in physical training. The suspension strap assembly for a punching bag suspends a heavy bag in a manner appropriate for use in the physical training for boxing activities. The suspension strap assembly for a punching bag comprises a superior mount, a suspension apparatus, and a heavy bag. The suspension apparatus attaches the heavy bag to the superior mount. The heavy bag provides a target used for physical training. The superior mount suspends the suspension apparatus and the heavy bag from a load bearing structure such that the load of the suspension apparatus and the heavy bag are incorporated into the load path of a building or structure.

These together with additional objects, features and advantages of the suspension strap assembly for a punching bag will be readily apparent to those of ordinary skill in the art upon reading the following detailed description of the presently preferred, but nonetheless illustrative, embodiments when taken in conjunction with the accompanying drawings.

In this respect, before explaining the current embodiments of the suspension strap assembly for a punching bag in detail, it is to be understood that the suspension strap assembly for a punching bag is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the suspension strap assembly for a punching bag.

It is therefore important that the claims be regarded as including such equivalent construction insofar as they do not depart from the spirit and scope of the suspension strap assembly for a punching bag. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 2 is a detail view of an embodiment of the disclosure.
FIG. 3 is a detail view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
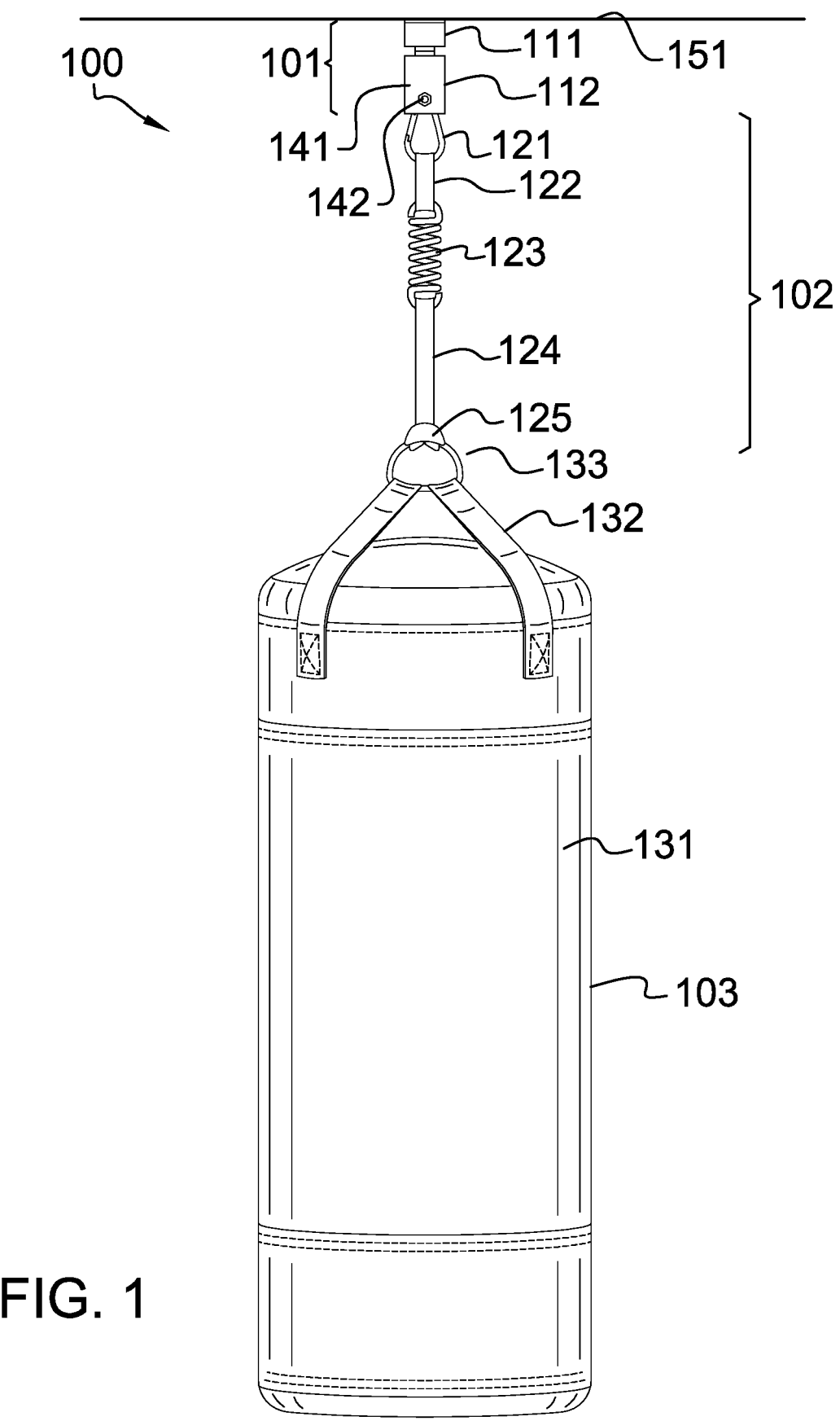
FIG. 1 is a front view of an embodiment of the disclosure.
Figure 4:
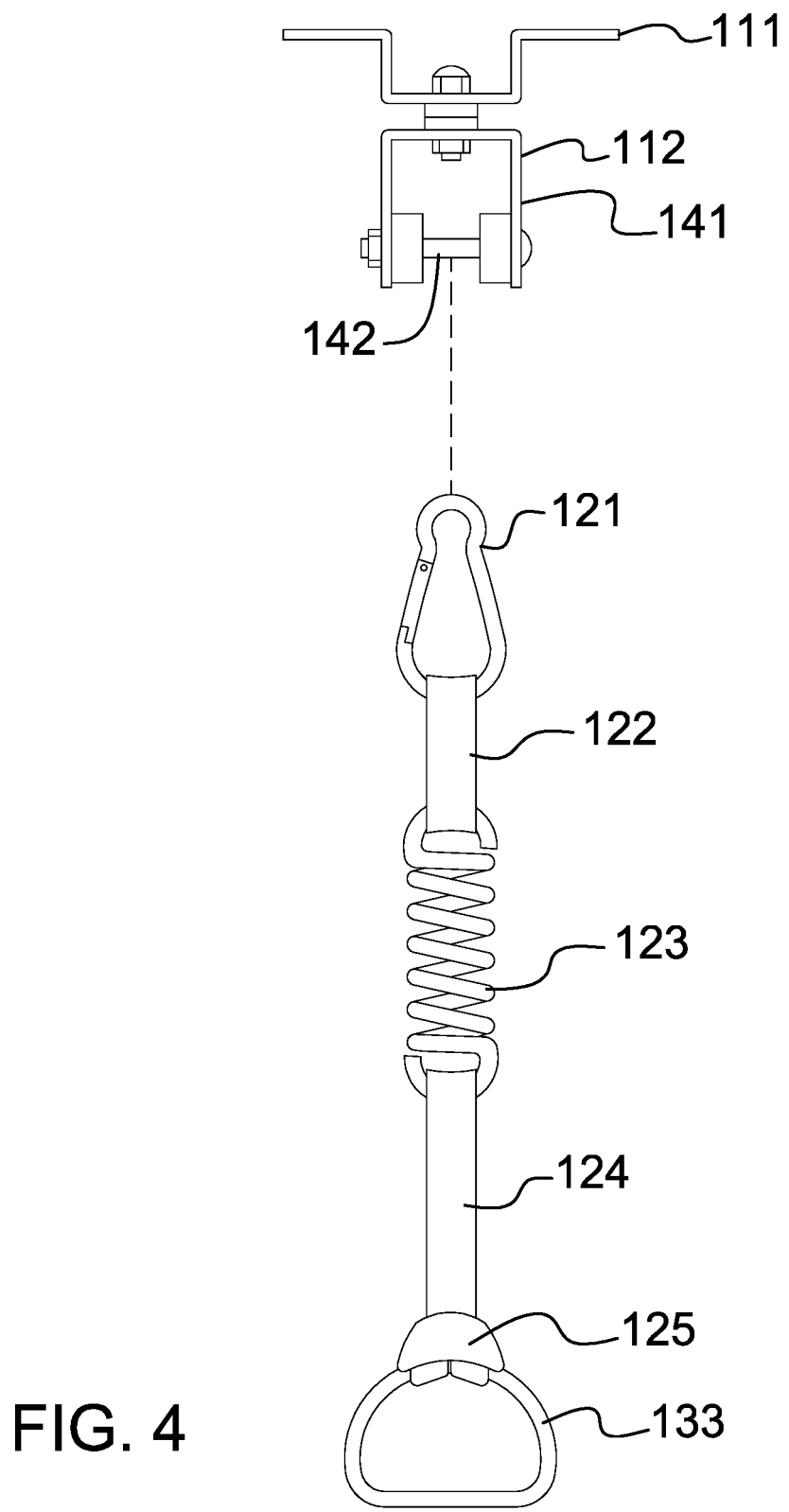
FIG. 4 is an exploded view of an embodiment of the disclosure.

Detailed reference will now be made to one or more potential embodiments of the disclosure, which are illustrated in FIGS. 1 through 4.

The suspension strap assembly for a punching bag 100 (hereinafter invention) is an apparatus that is configured for use in physical training. The invention 100 suspends a heavy bag 103 in a manner appropriate for use in the physical training for boxing activities. The invention 100 comprises a superior mount 101, a suspension apparatus 102, and a heavy bag 103. The suspension apparatus 102 attaches the heavy bag 103 to the superior mount 101. The heavy bag 103 provides a target used for physical training. The superior mount 101 suspends the suspension apparatus 102 and the heavy bag 103 from a load bearing structure 151 such that the load of the suspension apparatus 102 and the heavy bag 103 are incorporated into the load path of a building or structure.

The superior mount 101 is a mechanical structure. The superior mount 101 forms a load path that transfers the load of the suspension apparatus 102 and the heavy bag 103 to the load bearing structure 151. The superior mount 101 suspends the invention 100 from the load bearing structure 151. The superior mount 101 attaches the suspension apparatus 102 to the load bearing structure 151 such that the superior mount 101 transfers the load of the suspension apparatus 102 and the heavy bag 103 to the load bearing structure 151. The superior mount 101 comprises a ceiling bracket 111 and a c-ring structure 112. The c-ring structure 112 attaches the suspension apparatus 102 to the ceiling bracket 111.

The ceiling bracket 111 is a hardware item. The ceiling bracket 111 is a fastening device. The ceiling bracket 111 attaches directly to the load bearing structure 151. The ceiling bracket 111 provides an anchor point to which the c-ring structure 112 attaches. The ceiling bracket 111 forms a load path that transfers the load of the invention 100 to the load bearing structure 151.

The c-ring structure 112 is a hardware-based item. The c-ring structure 112 is a fastening device. The c-ring structure 112 forms a loop structure. The c-ring structure 112 permanently attaches to the ceiling bracket 111. The c-ring structure 112 forms a loop structure to which the suspension apparatus 102 removably attaches. The c-ring structure 112 forms a load path that transfers the load of the suspension apparatus 102 and the heavy bag 103 to the load bearing structure 151. The c-ring structure 112 the c-ring is defined elsewhere in this disclosure. The c-ring structure 112 further comprises a c-channel 141 and a piston bolt 142.

The c-channel 141 is a u-shaped structure. The c-channel 141 and the u-shaped structure are defined elsewhere in this disclosure. The c-channel 141 mechanically attaches the c-ring structure 112 to the ceiling bracket 111. Specifically, the crossbeam of the u-shaped structure that forms the c-channel 141 attaches to the ceiling bracket 111.

The piston bolt 142 is a bolt. The piston bolt 142 attaches the first arm of the u-shaped structure of the c-channel 141 to the second arm of the u-shaped structure of the c-channel 141. The piston bolt 142 attaches to a nut formed in the first arm of the u-shaped structure of the c-channel 141 using a threaded connection. The piston bolt 142 simultaneously attaches to a nut formed in the second arm of the u-shaped structure of the c-channel 141 using a threaded connection. The simultaneous attachment to the first arm and the second arm of the c-channel 141 by the piston bolt 142 forms a closed loop structure to which the carabiner 121 of the suspension apparatus 102 anchors.

The suspension apparatus 102 is a mechanical structure. The suspension apparatus 102 is an elastic structure. The suspension apparatus 102 forms a load path that transfers the load of the heavy bag 103 to the superior mount 101. The suspension apparatus 102 suspends the heavy bag 103 from the superior mount 101. The elastic nature of the suspension apparatus 102 absorbs impulses applied to the heavy bag 103 such that the application of repeated impulses to the heavy bag 103 will not be transferred to the load bearing structure 151. The suspension apparatus 102 comprises a carabiner 121, a superior loop structure 122, a tension spring 123, and an inferior loop structure 124. The carabiner 121 attaches the superior loop structure 122 to the c-ring structure 112 of the superior mount 101. The superior loop structure 122 attaches the tension spring 123 to the carabiner 121. The tension spring 123 attaches the superior loop structure 122 to the inferior loop structure 124.

The carabiner 121 is a fastening device. The carabiner 121 removably attaches the superior loop structure 122 to the c-ring structure 112 of the superior mount 101. The carabiner 121 is defined elsewhere in this disclosure.

The superior loop structure 122 is a textile-based structure. The superior loop structure 122 is formed from a webbing. The superior loop structure 122 is attached to itself using a sewn seam such that the superior loop structure 122 forms a loop. The carabiner 121 removably attaches to the superior loop structure 122. The tension spring 123 hooks on to the superior loop structure 122 such that the superior loop structure 122 attaches the tension spring 123 to the carabiner 121.

The tension spring 123 is a commercially available spring. The tension spring 123 forms a mechanical structure that deforms when the tension spring 123 is subjected to impulses from physical training activities. The tension spring 123 absorbs and diffuses impulses that are generated by the physical training activity. The tension spring 123 hooks on to the inferior loop structure 124 such that the tension spring 123 attaches the inferior loop structure 124 to the superior loop structure 122.

The inferior loop structure 124 is a textile-based structure. The inferior loop structure 124 is formed from a webbing. The inferior loop structure 124 is attached to itself using a sewn seam such that the inferior loop structure 124 forms a loop. The tension spring 123 hooks on to the inferior loop structure 124. The inferior loop structure 124 attaches to the heavy bag 103 using a ring loop knot 125. The ring loop knot 125, also referred to as a cow hitch, is defined elsewhere in this disclosure.

The heavy bag 103 is a strength training apparatus. The heavy bag 103 has the primary shape of a cylinder. The heavy bag 103 is configured to receive punches. The heavy bag 103 attaches to the suspension apparatus 102 such that the heavy bag 103 is suspended above a supporting surface. The heavy bag 103 comprises a cylinder structure 131, a plurality of sling straps 132, and a supporting ring 133.

The cylinder structure 131 is a mechanical structure that is configured to receive blows from an individual using the heavy bag 103 for physical training activities. The cylinder structure 131 of a heavy bag 103 is a well-known and documented structure.

Each of the plurality of sling straps 132 is a webbing. Each of the plurality of sling straps 132 permanently attaches to the cylinder structure 131. Each of the plurality of sling straps 132 permanently attaches to the supporting ring 133. When the cylinder structure 131 is suspended above the supporting surface, each of the plurality of sling straps 132 forms a portion of the load path that transfers the load of the cylinder structure 131 to the supporting ring 133.

The supporting ring 133 is a ring shaped structure. The supporting ring 133 forms an anchor point to which each of the plurality of sling straps 132 attaches. The supporting ring 133 forms an anchor point to which the inferior loop structure 124 of the suspension apparatus 102. The supporting ring 133 forms the portion of the load path that attaches the plurality of sling straps 132 to the suspension apparatus 102. The inferior loop structure 124 attaches to the supporting ring 133 using the ring loop knot 125.

The following definitions were used in this disclosure:

Anchor: As used in this disclosure, anchor means to hold an object firmly or securely.

Anchor Point: As used in this disclosure, an anchor point is a location to which a first object can be securely attached to a second object.

Bolt: As used in this disclosure, a bolt is a cylindrical shaft that is formed with an exterior screw thread. A bolt is defined with an outer diameter.

Bracket: As used in this disclosure, a bracket is a mechanical structure that attaches a second structure to a first structure such that the load path of the second structure is fully transferred to the first structure.

C-Channel: As used in this disclosure, the C-channel is a load bearing structure, such as a beam, that is formed in a U-shape. The C-channel forms a prism shape with a hollow interior and an open face that forms a shape characteristic of the letter C. The open space of the C-channel is often used as a track. A C-channel is a U-shaped structure.

C-Ring: As used in this disclosure, a C-ring is a U-shaped structure that comprises a C-channel and a piston bolt. The C-channel is a U-shaped structure. The first arm of the C-channel is formed with a first nut that is sized to receive the piston bolt to form a first threaded connection. The second arm of the C-channel is formed with a second nut that is sized to receive the piston bolt to form a second threaded connection. A C-ring can attach to a ring shaped object by inserting an arm of the C-channel structure of the C-ring through the ring shaped object and then screwing the piston bolt through both the first nut and the second nut such that the ring shaped object is captured between the crossbeam of the U-shaped structure that forms the C-channel structure and the piston bolt.

Carabiner: As used in this disclosure, a carabiner is a coupling link that is usually formed as an oblong metal ring with one spring hinged side that is used to open and close the ring. Synonyms for carabiner include D-link.

Ceiling: As used in this disclosure, a ceiling refers to either: 1) the superior horizontal surface of a room that is distal from the floor; 2) the superior horizontal surface of a structure; or, 3) the upper limit of a range. A floor and a ceiling can refer to the same structure wherein the selection depends solely on the point of view of the user. The selection of this definition depends on the context. In situations where the context is unclear the first definition should be used.

Cord: As used in this disclosure, a cord is a long, thin, flexible, and prism shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elastic Nature: As used in this disclosure, an elastic nature refers to a flexible structure that returns to its relaxed shape after the flexible structure has been deformed.

Fastener: As used in this disclosure, a fastener is a device that is used to join or affix a first object to a second object.

Force of Gravity: As used in this disclosure, the force of gravity refers to a vector that indicates the direction of the pull of gravity on an object at or near the surface of the earth.

Inelastic Nature: As used in this disclosure, an inelastic nature refers to a flexible structure that maintains its new shape after the flexible structure has been deformed.

Inferior: As used in this disclosure, the term inferior refers to a directional reference that is parallel to and in the same direction as the force of gravity when an object is positioned or used normally.

Knot: As used in this disclosure, a knot is an interlacement of cord, ribbon, rope, or similar materials that is used to: 1) secure the cord, ribbon, rope, or other similar material to an object which may include, but is not limited to, a second cord, ribbon, rope, or other similar material; or, 2) prevent the cord, ribbon, rope, or other similar material from being pulled through a hole or out of a retaining device. In this disclosure, the second type of knot is referred to as a stopper knot.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear Mount: As used in this disclosure, a mount is a mechanical structure that attaches or incorporates a first object to a second object.

Nut: As used in this disclosure, a nut is a first object that is formed with a cylindrical negative space that further comprises an interior screw thread such that a second object with a matching exterior screw thread can screwed into the first object forming a threaded connection. A nut is further defined with an inner diameter.

Punching Bags and Speed Bags: As used in this disclosure, a punching bag or a speed bag is a structure that is suspended above the ground. The punching bag or speed bag is designed to receive punches and other blows from exercisers for physical training purposes, especially for combat sports such as boxing or mixed martial arts. Punching bags differentiated from speed bags by form and weight. Traditionally a punching bag is cylindrically shaped and significantly larger and heavier than a speed bag. A speed bag is traditionally spherically or pear shaped.

Relaxed Shape: As used in this disclosure, a structure is considered to be in its relaxed state when no shear, strain, or torsional forces are being applied to the structure.

Ring: As used in this disclosure, a ring is term that is used to describe a disk-like structure through which an aperture is formed. Rings are often considered loops.

Ring Loop: As used in this disclosure, a ring loop is a knot used to attach a flexible looped cord to a roughly linear object such as a shaft or a ring. The ring loop is formed by wrapping the flexible looped cord around the roughly linear object and subsequently inserted through the flexible looped cord itself. A ring loop is also called a cow hitch.

Seam: As used in this disclosure, a seam is a joining of: 1) a first textile to a second textile; 2) a first sheeting to a second sheeting; or, 3) a first textile to a first sheeting. Potential methods to form seams include, but are not limited to, a sewn seam, a heat bonded seam, an ultrasonically bonded seam, a laser seam, or a seam formed using an adhesive.

Sewn Seam: As used in this disclosure, a sewn seam a method of attaching two or more layers of textile, leather, or other material through the use of a thread, a yarn, or a cord that is repeatedly inserted and looped through the two or more layers of textile, leather, or other material.

Sling: As used in this disclosure, a sling refers to a structure that is used to support, cradle, or hoist an object, generally from above.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Strap: As used in this disclosure, a strap is a strip of leather, cloth, or other flexible material, often with a buckle, that is used to fasten, secure, carry, or hold onto something.

Strip: As used in this disclosure, the term describes a long and narrow object of uniform thickness that appears thin relative to the length of the object. Strips are often rectangular in shape.

Superior: As used in this disclosure, the term superior refers to a directional reference that is parallel to and in the opposite direction of the force of gravity when an object is positioned or used normally.

Suspend: As used in this disclosure, to suspend an object means to support an object such that the inferior end of the object does not form a significant portion of the load path of the object.

Tension Spring: As used in this disclosure, a tension spring, is an elastomeric structure that resists forces attempting to increase the span of the length of the elastomeric structure. The tension spring will return to its original position when the pulling force is removed.

Textile: As used in this disclosure, a textile is a material that is woven, knitted, braided or felted. Synonyms in common usage for this definition include fabric and cloth. The two surfaces of the textile with the greatest surface area are called the faces of the textile.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

U-Shaped Structure: As used in this disclosure, a U-shaped structure refers to a three-sided structure comprising a crossbeam, a first arm, and a second arm. In a U-shaped structure, the first arm and the second arm project away from the crossbeam: 1) in the same direction; 2) at a roughly perpendicular angle to the crossbeam, and, 3) the span of the length of the first arm roughly equals the span of the length of the second arm. The first arm and the second arm project away from the crossbeam in the manner of a cantilever.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips. Webbings have tensile strength but are too flexible to provide compressive strength and are not suitable for use in pushing objects. The shape of a webbing is approximated by a rectangular disk shape. The two surfaces of a webbing with the greatest surface area are called the faces of the webbing.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A sling for a punching bag comprising
a superior mount, a suspension apparatus, and a heavy bag;
wherein the suspension apparatus attaches the heavy bag to the superior mount;
wherein the heavy bag provides a target used for physical training;
wherein the sling for a punching bag is configured for use in physical training;
wherein the superior mount suspends the suspension apparatus and the heavy bag from a load bearing structure such that the load of the suspension apparatus and the heavy bag are incorporated into the load path of a building or structure;
wherein the suspension apparatus comprises a carabiner, a superior loop structure made of a textile-based webbing, a tension spring, and an inferior loop structure made of a textile-based webbing; wherein the carabiner removably attaches the superior loop structure to the superior mount and the inferior loop structure attaches to the heavy bag;
wherein the tension spring hooks on to the superior loop structure such that the superior loop structure attaches the tension spring to the carabiner;
wherein the tension spring forms a mechanical structure that deforms when the tension spring is subjected to impulses from physical training activities;
wherein the tension spring absorbs and diffuses impulses that are generated by the physical training activity;
wherein the tension spring hooks on to the inferior loop structure such that the tension spring attaches the inferior loop structure to the superior loop structure.

2. The sling for a punching bag according to claim 1
wherein the superior mount is a mechanical structure;
wherein the superior mount forms a load path that transfers the load of the suspension apparatus and the heavy bag to the load bearing structure;
wherein the superior mount suspends the sling for a punching bag from the load bearing structure;
wherein the superior mount attaches the suspension apparatus to the load bearing structure such that the superior mount transfers the load of the suspension apparatus and the heavy bag to the load bearing structure.

3. The sling for a punching bag according to claim 2
wherein the suspension apparatus is a mechanical structure;
wherein the suspension apparatus is an elastic structure;
wherein the suspension apparatus forms a load path that transfers the load of the heavy bag to the superior mount;
wherein the suspension apparatus suspends the heavy bag from the superior mount;

wherein the elastic nature of the suspension apparatus absorbs impulses applied to the heavy bag such that the application of repeated impulses to the heavy bag will not be transferred to the load bearing structure.

4. The sling for a punching bag according to claim 3
wherein the heavy bag is a strength training apparatus;
wherein the heavy bag has the primary shape of a cylinder;
wherein the heavy bag is configured to receive punches;
wherein the heavy bag attaches to the suspension apparatus such that the heavy bag is suspended above a supporting surface.

5. The sling for a punching bag according to claim 4
wherein the superior mount comprises a ceiling bracket and a c-ring structure;
wherein the c-ring structure attaches the suspension apparatus to the ceiling bracket.

6. The sling for a punching bag according to claim 5
wherein the carabiner attaches the superior loop structure to the c-ring structure of the superior mount;
wherein the superior loop structure attaches the tension spring to the carabiner;
wherein the tension spring attaches the superior loop structure to the inferior loop structure.

7. The sling for a punching bag according to claim 6
wherein the heavy bag comprises a cylinder structure, a plurality of sling straps, and a supporting ring;
wherein each of the plurality of sling straps attaches to the cylinder structure;
wherein each of the plurality of sling straps attaches to the supporting ring.

8. The sling for a punching bag according to claim 7
wherein the ceiling bracket is a fastening device;
wherein the ceiling bracket attaches directly to the load bearing structure;
wherein the ceiling bracket provides an anchor point to which the c-ring structure attaches;
wherein the ceiling bracket forms a load path that transfers the load of the sling for a punching bag to the load bearing structure.

9. The sling for a punching bag according to claim 8
wherein the c-ring structure is a fastening device;
wherein the c-ring structure forms a loop structure;
wherein the c-ring structure permanently attaches to the ceiling bracket;
wherein the c-ring structure forms a loop structure to which the suspension apparatus removably attaches;
wherein the c-ring structure forms a load path that transfers the load of the suspension apparatus and the heavy bag to the load bearing structure.

10. The sling for a punching bag according to claim 9
wherein the c-ring structure further comprises a c-channel and a piston bolt;
wherein the c-channel mechanically attaches the c-ring structure to the ceiling bracket.

11. The sling for a punching bag according to claim 10
wherein the c-channel is a u-shaped structure;
wherein the c-channel comprises a first arm, a second arm, and a crossbeam;
wherein the crossbeam of the u-shaped structure that forms the c-channel attaches to the ceiling bracket.

12. The sling for a punching bag according to claim 11
wherein the piston bolt is a bolt;
wherein the piston bolt attaches the first arm of the u-shaped structure of the c-channel to the second arm of the u-shaped structure of the c-channel;
wherein the simultaneous attachment to the first arm and the second arm of the c-channel by the piston bolt forms a closed loop structure to which the carabiner of the suspension apparatus anchors.

13. The sling for a punching bag according to claim 12
wherein the carabiner is a fastening device;
wherein the carabiner removably attaches the superior loop structure to the c-ring structure of the superior mount.

14. The sling for a punching bag according to claim 13
wherein the superior loop structure is attached to itself using a sewn seam.

15. The sling for a punching bag according to claim 14
wherein the inferior loop structure is attached to itself using a sewn seam;
wherein the inferior loop structure attaches to the heavy bag using a ring loop knot.

16. The sling for a punching bag according to claim 15
wherein each of the plurality of sling straps is a webbing.

17. The sling for a punching bag according to claim 16
wherein each of the plurality of sling straps permanently attaches to the cylinder structure;
wherein each of the plurality of sling straps permanently attaches to the supporting ring.

18. The sling for a punching bag according to claim 17
wherein the supporting ring is a ring shaped structure;
wherein the supporting ring forms an anchor point to which each of the plurality of sling straps attaches;
wherein the supporting ring forms an anchor point to which the inferior loop structure of the suspension apparatus;
wherein the supporting ring forms the portion of the load path that attaches the plurality of sling straps to the suspension apparatus;
wherein the inferior loop structure attaches to the supporting ring using the ring loop knot.

\* \* \* \* \*